US012553201B2

(12) United States Patent
Takahashi et al.

(10) Patent No.: US 12,553,201 B2
(45) Date of Patent: Feb. 17, 2026

(54) SNOW REMOVAL SYSTEM AND SNOW REMOVAL METHOD

(71) Applicant: HONDA MOTOR CO., LTD., Tokyo (JP)

(72) Inventors: Hiroto Takahashi, Wako (JP); Toshiaki Kawakami, Wako (JP); Taro Yokoyama, Wako (JP); Wei Song, Wako (JP); Takuya Kanisawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 670 days.

(21) Appl. No.: 17/911,670

(22) PCT Filed: Mar. 31, 2020

(86) PCT No.: PCT/JP2020/014765
§ 371 (c)(1),
(2) Date: Sep. 15, 2022

(87) PCT Pub. No.: WO2021/199254
PCT Pub. Date: Oct. 7, 2021

(65) Prior Publication Data
US 2023/0144636 A1 May 11, 2023

(51) Int. Cl.
*E01H 5/09* (2006.01)
*G05D 1/00* (2024.01)
(52) U.S. Cl.
CPC .......... *E01H 5/092* (2013.01); *G05D 1/0088* (2013.01)

(58) Field of Classification Search
CPC .. E01H 5/092; E01H 5/08; E01H 5/00; G05D 1/0088
See application file for complete search history.

(56) References Cited

U.S. PATENT DOCUMENTS 10,113,280 B2 * 10/2018 Letsky ................ G05D 1/0231
10,207,557 B2 * 2/2019 Björn ................... A01D 34/008
(Continued)

FOREIGN PATENT DOCUMENTS

JP 2003-044987 2/2003
JP 2007-092325 4/2007
(Continued)

OTHER PUBLICATIONS

International Search Report and Written Opinion for International Application No. PCT/JP2020/014765 mailed on Jun. 9, 2020, 9 pages.
(Continued)

*Primary Examiner* — Thomas Ingram
(74) *Attorney, Agent, or Firm* — Amin, Turocy & Watson, LLP

(57) ABSTRACT

A snow removal system includes a work machine and a snow removal machine. The work machine includes a work unit configured to perform work and a position detector configured to detect a position of the work machine when the work unit has performed the work and generate position information indicating the detected position. The snow removal machine is capable of autonomous movement and includes a snow removal unit configured to perform snow removal work and a controller configured to cause the snow removal unit to perform the snow removal work on the basis of the position information.

9 Claims, 9 Drawing Sheets

(56) References Cited

U.S. PATENT DOCUMENTS

| | | | |
|---|---|---|---|
| 11,044,844 B2* | 6/2021 | Keski-Luopa | A01D 34/008 |
| 2018/0143634 A1* | 5/2018 | Ott | G05D 1/0297 |
| 2021/0064045 A1* | 3/2021 | Yamamura | G05D 1/0044 |

FOREIGN PATENT DOCUMENTS

| | | |
|---|---|---|
| JP | 2019-074787 | 5/2019 |
| JP | 2019-082846 | 5/2019 |

OTHER PUBLICATIONS

Japanese Office Action for Japanese Patent Application No. 2022-512975 mailed Feb. 14, 2023.

\* cited by examiner

FIG. 10

| POSITION INFORMATION (1001) | OBSTACLE INFORMATION (1002) |
|---|---|
| NAA1, EXX1 | NO |
| ⋮ | ⋮ |
| NAAk, EXXk | YES |
| ⋮ | ⋮ |
| NAAn, EXXn | NO |

FIG. 11

| POSITION INFORMATION (1101) | UNEVENNESS INFORMATION (1102) |
|---|---|
| NAA1, EXX1 | NO |
| ⋮ | ⋮ |
| NAAk, EXXk | YES |
| ⋮ | ⋮ |
| NAAn, EXXn | NO |

FIG. 12

| POSITION INFORMATION | NUMBER OF PEOPLE | TIME |
|---|---|---|
| NAA1, EXX1 | 0 | 13:xx |
| ⋮ | ⋮ | ⋮ |
| NAAk, EXXk | 15 | 14:yy |
| ⋮ | ⋮ | ⋮ |
| NAAn, EXXn | 3 | 15:zz |

1201 / 1202 / 1203

SNOW REMOVAL SYSTEM AND SNOW REMOVAL METHOD

TECHNICAL FIELD

The present invention relates to a snow removal system and a snow removal method.

BACKGROUND ART

Patent Literature 1 discloses a technique for registering a route on which an autonomous snow removal machine performs a snow removal work. In this technique, a user carries a special device, and registers position information in the device while walking on the route for snow removal target. The autonomous snow removal machine acquires the registered position information from the device, and performs the snow removal work on the basis of the position information.

CITATION LIST

Patent Literature

[Patent Literature 1]
United States Patent Application, Publication No. 2018/0143634 A

SUMMARY OF INVENTION

Technical Problem

However, the technique disclosed in Patent Literature 1 requires work for the user to set the route, which requires time and effort.

An object of the present invention is to provide a snow removal system and a snow removal method capable of easily setting a region to be a snow removal target in a snow removal machine.

Solution to Problem

According to an aspect of the present invention, a snow removal system includes a work machine and a snow removal machine. The work machine includes a work unit configured to perform work and a position detector configured to detect a position of the work machine when the work unit has performed the work and generate position information indicating the detected position. The snow removal machine is capable of autonomous movement and includes a snow removal unit configured to perform snow removal work and a controller configured to cause the snow removal unit to perform the snow removal work on the basis of the position information.

According to an aspect of the present invention, a snow removal method includes a work step, a detection step, and a snow removal step. A work machine performs work in the work step. When the work machine has performed the work, in the detection step, the work machine detects a position of the work machine and generates position information indicating the detected position. A snow removal machine performs snow removal work on the basis of the position information in the snow removal step.

Advantageous Effects of Invention

According to the present invention, in the snow removal system and the snow removal method, a snow removal target region can be easily set in the snow removal machine.

BRIEF DESCRIPTION OF DRAWINGS

FIG. 10 is a diagram illustrating an example of obstacle information according to a modification example of the embodiment of the present invention.

FIG. 11 is a diagram illustrating an example of unevenness information according to a modification example of the embodiment of the present invention.

FIG. 12 is a diagram illustrating an example of number-of-people information according to a modification example of the embodiment of the present invention.

DESCRIPTION OF EMBODIMENTS

Figure 1:
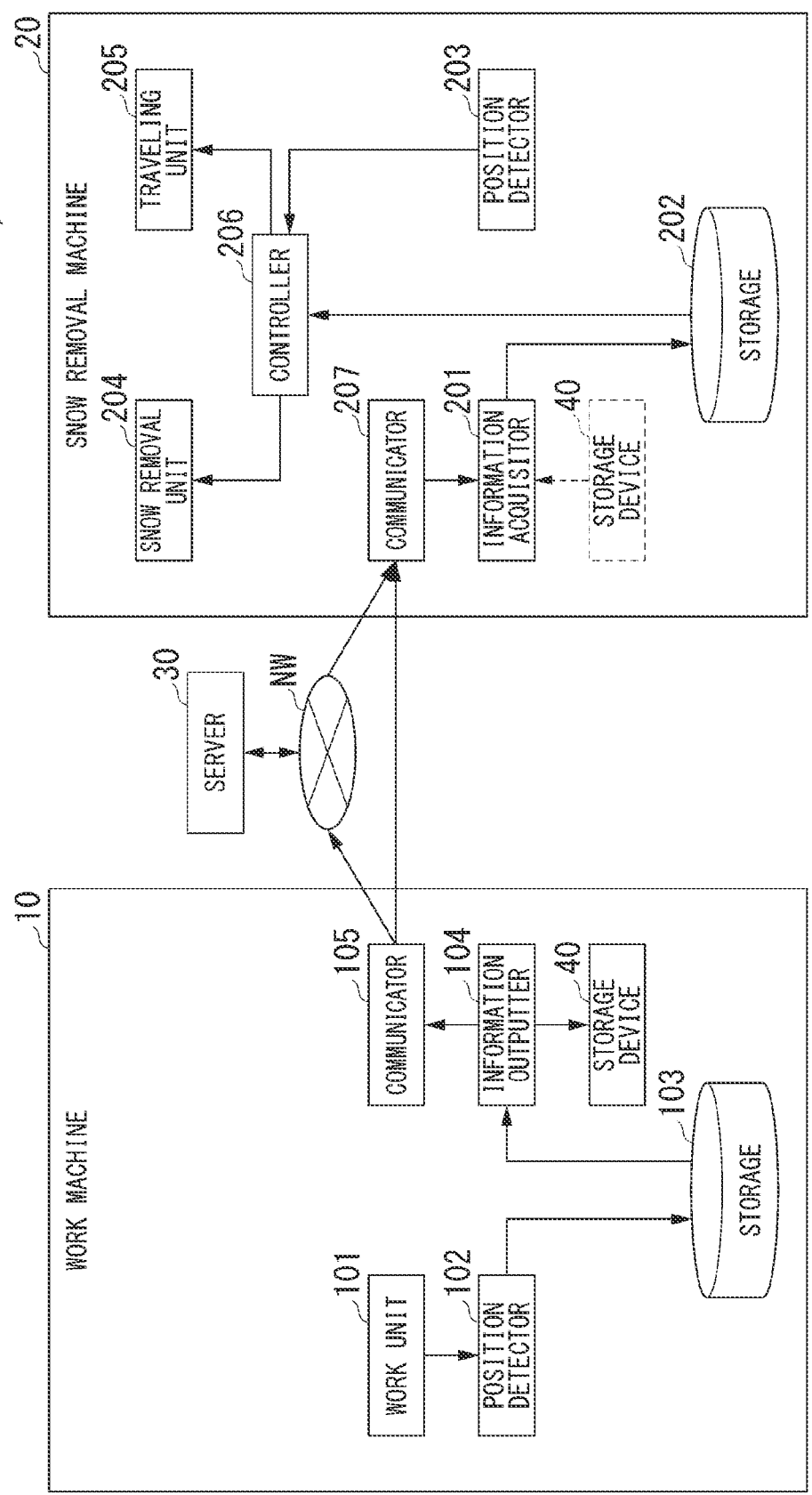
FIG. 1 is a block diagram illustrating a constitution of a snow removal system according to an embodiment of the present invention.

Hereinafter, an embodiment of the present invention will be described with reference to the drawings. FIG. 1 illustrates a constitution of a snow removal system 1 according to the embodiment of the present invention. A constitution of the snow removal system 1 will be described with reference to FIG. 1. The snow removal system 1 illustrated in FIG. 1 includes a work machine 10 and a snow removal machine 20.

For example, the work machine 10 is a blower, a vacuum cleaner, a lawn mower, or an edge mower. A blower is used to return, to a lawn on which a mowing operation has been performed, grass popped out onto a road around the lawn. A vacuum cleaner is used to suck up grass popping out onto the road around the lawn. A lawn mower is used to mow grass on the lawn. The grass means lawn grass. The lawn grass is an example of grass, and other examples of grass include weeds. Accordingly, the lawn mower is an example of a grass mower. An edge mower is used to cut grass at a boundary of the lawn. The work machine 10 may be a device other than a blower, a vacuum cleaner, a lawn mower, and an edge mower. Although one work machine 10 is illustrated in FIG. 1, the snow removal system 1 may include a plurality of work machines 10.

The worker may perform the work by holding the work machine 10 by hand. The worker may push the work machine 10 from behind to perform the work. The worker may perform the work by riding on the work machine 10 and operating the work machine. The work machine 10 may be an autonomous work machine capable of autonomous movement. The snow removal machine 20 is an autonomous snow removal machine capable of autonomous movement. The autonomous movement means that the device detects the own position thereof and autonomously controls the movement.

For example, the work machine 10 operates in a period different from a period in which the snow removal machine 20 performs snow removal work. The snow removal machine 20 operates in winter, and the work machine 10 operates in spring, summer, or autumn. The day on which the work machine 10 operates may be different from the day on which the snow removal machine 20 operates. The time period in which the work machine 10 operates may be different from the time period in which the snow removal machine 20 operates.

The work machine 10 includes a work unit 101, a position detector 102, a storage 103, an information outputter 104, and a communicator 105. The work unit 101 includes a prime mover and performs work according to the model of the work machine 10. When the work machine 10 is a blower, the work unit 101 includes a blower unit that sends air. In a case where the work machine 10 is a vacuum cleaner, the work unit 101 includes an intake unit that sucks air. When the work machine 10 is a lawn mower, the work unit 101 includes a cutter for cutting the grass.

When the work machine 10 is a blower or a vacuum cleaner, the work unit 101 performs work of removing grass or the like on a snow removal target region. For example, the snow removal target region is a road. The snow removal target region may include a place (for example, a parking lot) connected to a road. In a case where the work machine 10 is a lawn mower, the work unit 101 performs work of cutting grass in a region (lawn) not serving as a snow removal target. For example, the region where the lawn mowing work is performed is adjacent to the snow removal target region. When the work machine 10 is an edge mower, the work unit 101 performs a work of cutting grass at a boundary of the lawn.

The position detector 102 detects the position of the work machine 10 when the work machine 10 is performing work, and generates position information indicating the detected position. For example, the position detector 102 is a global positioning system (GPS) receiver including a processor such as a central processing unit (CPU).

The storage 103 stores the position information generated by the position detector 102. The storage 103 is a storage medium such as a flash memory or a hard disk drive. The storage 103 may be attachable to and detachable from the work machine 10.

The information outputter 104 outputs the position information stored in the storage 103. For example, the information outputter 104 is a processor such as a CPU. The information outputter 104 communicates with the snow removal machine 20 as a result of the work machine 10 controlling the communicator 105. The communicator 105 may directly communicate with the snow removal machine 20. The communicator 105 may communicate with the snow removal machine 20 via a server 30 on a network NW. The information outputter 104 communicates with the snow removal machine 20 by the above-described method, and transmits the position information to the snow removal machine 20. The information outputter 104 may record the position information in a storage device 40 attachable to and detachable from the work machine 10. The storage device 40 is a storage medium such as a memory card, a DVD, a CD, or a hard disk drive.

The position detector 102 and the information outputter 104 may be circuits such as a large scale integration (LSI), an application specific integrated circuit (ASIC), and a field-programmable gate array (FPGA). The functions of the position detector 102 and the information outputter 104 may be implemented by a processor executing a program.

The program may be provided by a "computer-readable recording medium" such as a flash memory. The program may be transmitted from a computer holding the program to the work machine 10 via a transmission medium or by a transmission wave in the transmission medium. A "transmission medium" for transmitting a program is a medium having a function of transmitting information. Examples of the medium having the function of transmitting information include a network (communication network) such as the Internet and a communication line (communication wire) such as a telephone line. The program described above may implement part of the functions described above. Furthermore, the above-described program may be a difference file (difference program). A combination of a program already recorded in the computer and a difference program may realize the above-described functions.

The snow removal machine 20 includes an information acquisitor 201, a storage 202, a position detector 203, a snow removal unit 204, a traveling unit 205, a controller 206, and a communicator 207. The information acquisitor 201 acquires position information of the work machine 10. For example, the information acquisitor 201 is a processor such as a CPU. The information acquisitor 201 communicates with the work machine 10 by controlling the communicator 207. The communicator 207 may directly communicate with the work machine 10. The communicator 207 may communicate with the work machine 10 via the server 30 on the network NW. When the storage device 40 is detached from the work machine 10 and attached to the snow removal machine 20, the information acquisitor 201 may read the position information from the storage device 40.

The storage 202 stores the position information acquired by the information acquisitor 201. The storage 202 is a storage medium such as a flash memory or a hard disk drive. The storage 202 may be attachable to and detachable from the snow removal machine 20.

The position detector 203 detects the position of the snow removal machine 20 when the snow removal machine 20 is performing snow removal work, and generates position information indicating the detected position. For example, the position detector 203 is a GPS receiver including a processor such as a CPU.

The snow removal unit 204 performs snow removal work in the snow removal target region. For example, the snow removal unit 204 includes a prime mover, an auger that collects snow in front of the snow removal machine 20, a shooter that shoots the collected snow to a position away from the snow removal machine 20, and the like.

The traveling unit 205 causes the snow removal machine 20 to travel. For example, the traveling unit 205 includes a prime mover, wheels, and the like.

The controller 206 controls the snow removal unit 204 and the traveling unit 205. For example, the controller 206 is a processor such as a CPU. The controller 206 controls the traveling unit 205 on the basis of the position information of the work machine 10 stored in the storage 202 and the position information of the snow removal machine 20 generated by the position detector 203. As a result of this, the controller 206 causes the snow removal machine 20 to travel in the snow removal target region.

The information acquisitor 201, the position detector 203, and the controller 206 may be circuits such as LSI, ASIC, and FPGA. The functions of the information acquisitor 201, the position detector 203, and the controller 206 may be implemented by a processor executing a program.

Figure 2:
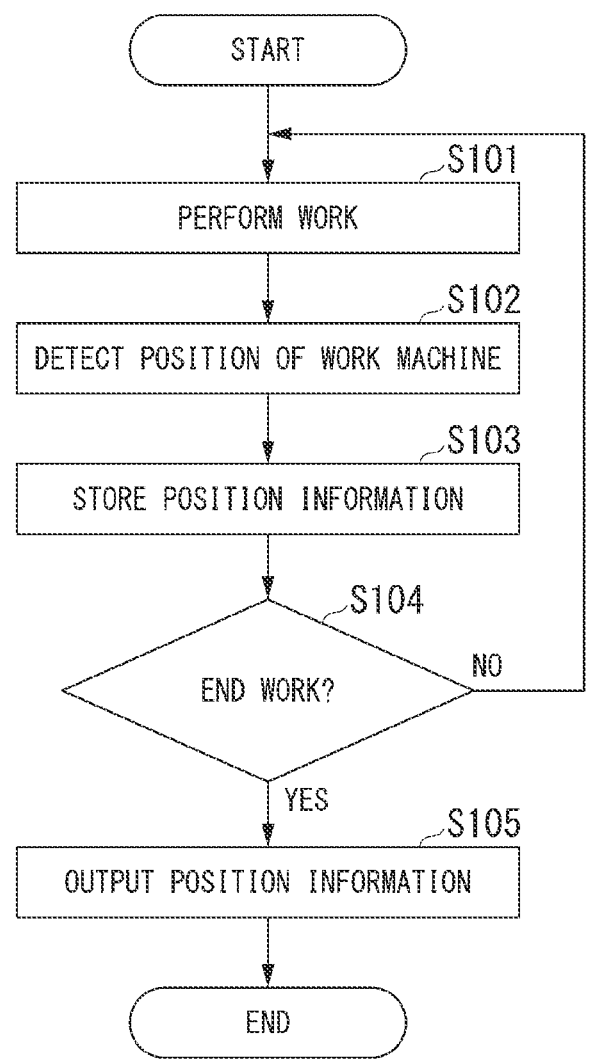
FIG. 2 is a flowchart illustrating a procedure of operation of a work machine according to the embodiment of the present invention.

FIG. 2 illustrates a procedure of the operation of the work machine 10. The operation of the work machine 10 will be described with reference to FIG. 2.

When the work machine 10 is powered on, the work unit 101 starts working. The work unit 101 performs work according to the model of the work machine 10 (step S101).

After step S101 is executed, the position detector 102 detects the position of the work machine 10 and generates position information indicating the detected position (step S102).

After step S102 is executed, the position detector 102 stores the generated position information in the storage 103 (step S103).

After step S103 is executed, an unillustrated controller determines whether or not to end the work (step S104). For example, when a button, a switch, or the like for turning off the power of the work machine 10 is operated by the worker, the controller determines to end the work. When the button, the switch, or the like is not operated by the worker, the controller determines to not end the work.

In a case where the controller has determined not to end the work, step S101 is executed again. Until the worker instructs the work machine 10 to end the work, the work unit 101 repeatedly performs the work, and the position detector 102 repeatedly detects the position of the work machine 10. The work unit 101 may perform the work in step S101 in parallel with at least part of step S102, step S103, and step S104.

When the controller has determined to end the work, the work unit 101 ends the work, and the information outputter 104 outputs the position information (step S105). When the information outputter 104 receives an output request from the snow removal machine 20, the information outputter 104 may output the position information. The work machine 10 may operate in a mode for outputting the position information. For example, when the work unit 101 is not operating, the information outputter 104 may output the position information. At this time, power may be supplied to the information outputter 104 without supplying the power to the work unit 101. The information outputter 104 may cause the communicator 105 to sequentially transmit the position information to the server 30 while the work unit 101 is performing the work.

Figure 3:
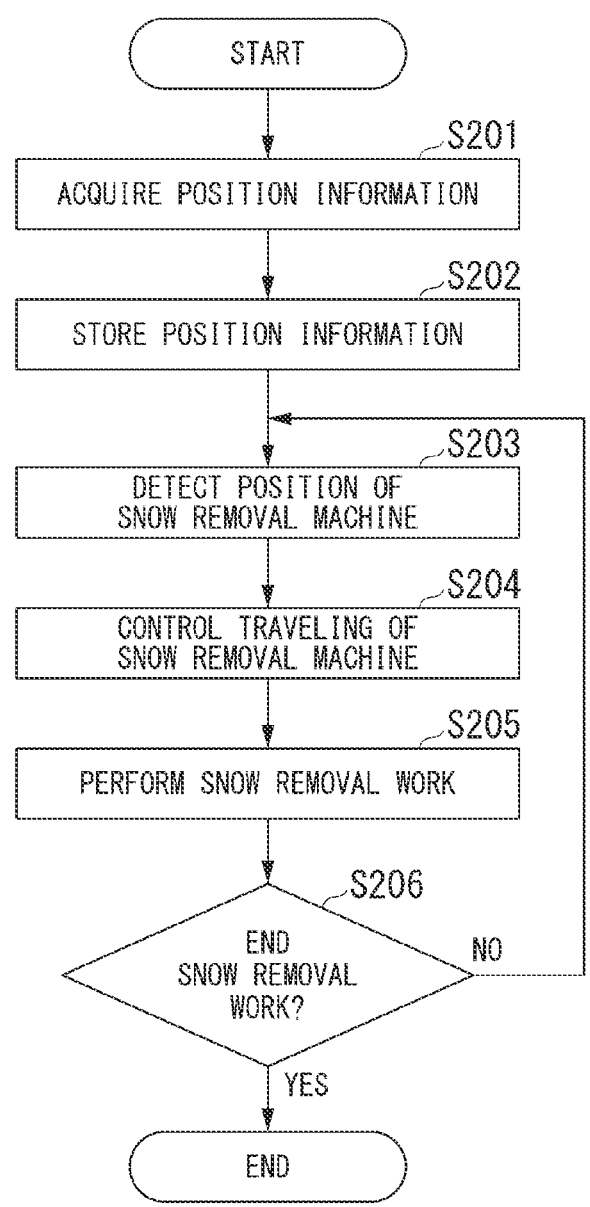
FIG. 3 is a flowchart illustrating a procedure of operation of a snow removal machine according to the embodiment of the present invention.

FIG. 3 illustrates a procedure of the operation of the snow removal machine 20. The operation of the snow removal machine 20 will be described with reference to FIG. 3.

When the snow removal machine 20 is powered on, the information acquisitor 201 acquires the position information of the work machine 10 (step S201). The information acquisitor 201 may acquire the position information after transmitting an output request to the work machine 10. The snow removal machine 20 may operate in a mode for acquiring the position information. For example, when the snow removal unit 204 is not operating, the information acquisitor 201 may acquire the position information. At this time, power may be supplied to the information acquisitor 201 without supplying the power to the snow removal unit 204.

After step S201 is executed, the information acquisitor 201 stores the acquired position information in the storage 202 (step S202). After the position information is stored in the storage 202, the snow removal unit 204 may turn off the power of the snow removal machine 20 without performing the snow removal work. When the power of the snow removal machine 20 is turned on again, the following step S203 may be executed.

After step S202 is executed, the position detector 203 detects the position of the snow removal machine 20 and generates position information indicating the detected position (step S203).

After step S203 is executed, the controller 206 determines the snow removal target region on the basis of the position indicated by the position information of the work machine 10 stored in the storage 202. The controller 206 controls the traveling unit 205 on the basis of the position information of the snow removal machine 20 generated by the position detector 203. That is, the controller 206 controls the traveling unit 205 so that the position of the snow removal machine 20 is included in the snow removal target region (step S204). As a result of this, the snow removal machine 20 travels in the snow removal target region.

After step S204 is executed, the controller 206 causes the snow removal unit 204 to perform snow removal work (step S205). Since the snow removal machine 20 travels in the snow removal target region, the snow removal unit 204 performs the snow removal work in the snow removal target region.

For example, in step S204, the controller 206 may set the route so that the snow removal machine 20 passes through the entirety of the set snow removal target region, and cause the snow removal machine 20 to travel along the set route. In addition, in a case where the snow removal machine 20 is, for example, a snow removal machine of a type that removes snow by flicking off snow on a road with a rotating brush, the controller 206 may set the direction of the snow removal unit 204 so as to flick off snow toward a region not serving as a snow removal target in step S205. In a case where the snow removal machine 20 is a snow removal machine of a type including a blower and a shooter, in step S205, the controller 206 may set the direction and angle of the shooter so as to project snow toward a region not serving a snow removal target.

After step S205 is executed, the controller 206 determines whether or not to end the snow removal work (step S206). For example, when a button, a switch, or the like for turning off the power of the snow removal machine 20 is operated by the worker, the controller 206 determines to end the snow removal work. If the button, the switch, or the like is not operated by the worker, the controller 206 determines to not end the snow removal work.

In a case where the controller 206 has determined not to end the snow removal work, step S203 is executed again. Until the worker instructs the snow removal machine 20 to end the snow removal work, the position detector 203 repeatedly detects the position of the snow removal machine 20, the controller 206 repeatedly controls the traveling unit 205, and the snow removal unit 204 repeatedly performs the snow removal work. The snow removal unit 204 may perform the snow removal work in step S205 in parallel with at least apart of step S203, step S204, and step S206. When the controller 206 has determined to end the snow removal work, the traveling unit 205 stops traveling, and the snow removal unit 204 ends the snow removal work.

Figure 4:
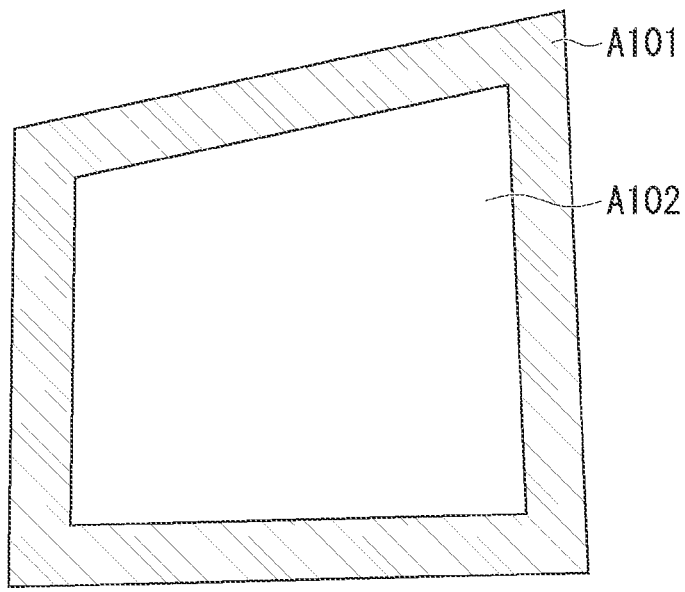
FIG. 4 is a diagram illustrating an example of a snow removal target region in the embodiment of the present invention.

A method of setting a snow removal target region will be described with reference to FIGS. 4 to 7. FIG. 4 illustrates an example of a snow removal target region in a case where the work machine 10 is a blower or a vacuum cleaner. The work machine 10 performs work of removing grass or the like in a region A101 which is a snow removal target region. The region A101 surrounds a region A102, which is a lawn. The position detector 102 generates position information of the region A101 where the work has been performed.

The region A101 where the work machine 10 has performed work is a snow removal target region. The controller 206 detects the region A101 including a position indicated by the position information of the work machine 10, and sets the region A101 as a snow removal target region. The controller 206 controls the traveling unit 205 so that the position of the snow removal machine 20 is included in the region A101. The snow removal machine 20 performs the snow removal work in the region A101.

Figure 5:
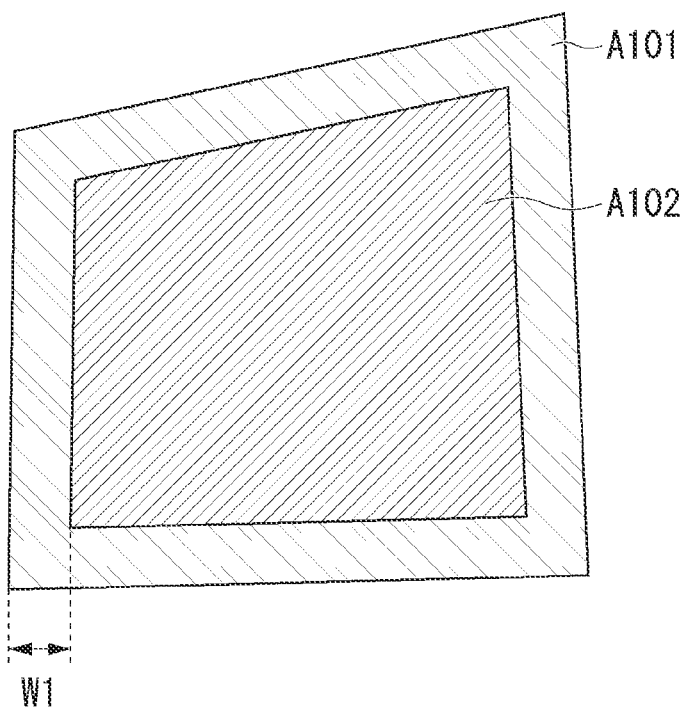
FIG. 5 is a diagram illustrating an example of a snow removal target region in the embodiment of the present invention.

FIG. 5 illustrates an example of a snow removal target region in a case where the work machine 10 is a lawn mower. The work machine 10 performs work of cutting grass in the region A102 that is a lawn. The region A102 is surrounded by the region A101, which is a road. The position detector 102 generates position information of the region A102 where the work has been performed.

The controller 206 detects the region A102 including the position indicated by the position information of the work machine 10, and sets the region A101 excluding the region A102 as a snow removal target region. The region A101 is outside the region A102, is adjacent to the region A102, and has a predetermined width W1 set in advance. The width W1 is the width of the road. The controller 206 controls the traveling unit 205 so that the position of the snow removal machine 20 is included in the region A101. The snow removal machine 20 performs the snow removal work in the region A101. The worker may set the width W1 in the snow removal machine 20 by operating an operation portion included in the snow removal machine 20.

The width of the snow removal target region does not need to be the width of the whole road. For example, a region having a width sufficient for a person to pass through may be set as the snow removal target region. In addition, the road is not limited to a road paved for a person or a vehicle to pass through, and examples thereof also include a non-paved road or the like simply having no lawn.

Figure 6:
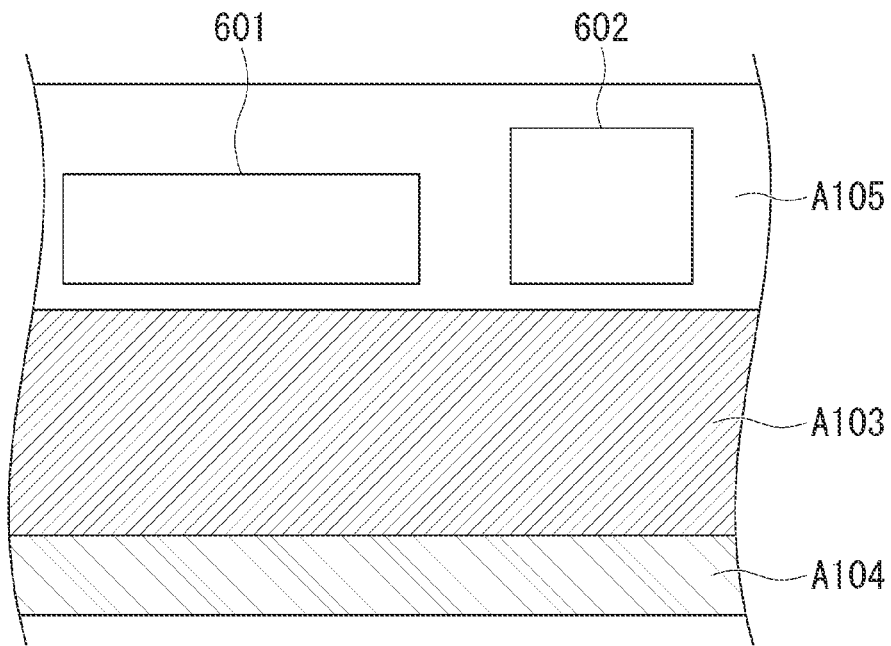
FIG. 6 is a diagram illustrating an example of a snow removal target region in the embodiment of the present invention.

In some cases, the lawn is adjacent to a region that is not a road. FIG. 6 illustrates an example of a snow removal target region in such a case. A region A103 is a lawn, and the work machine 10 performs work of cutting the grass in the region A103. The region A103 is adjacent to a region A104 and a region A105. The region A104 is a road. The region A105 includes a house 601 and a house 602. The region A105 may be a forest, a river, or the like. The region A105 is not a road, and is therefore not a snow removal target region.

For example, the controller 206 determines the snow removal target region on the basis of the position information of the work machine 10 and map information. The map information includes at least position information of the road. When the map information indicates that there is a road on the region A104 side, the controller 206 sets the region A104 adjacent to the region A103 and having a predetermined width as a snow removal target region. When the map information indicates that there is no road on the region A105 side, the controller 206 excludes the region A105 adjacent to the region A103 from the snow removal target region. As described above, the controller 206 determines the snow removal target region on the basis of the information indicating the type (road, lawn, or the like) of a region adjacent to the region where the work machine 10 has performed work.

Figure 7:
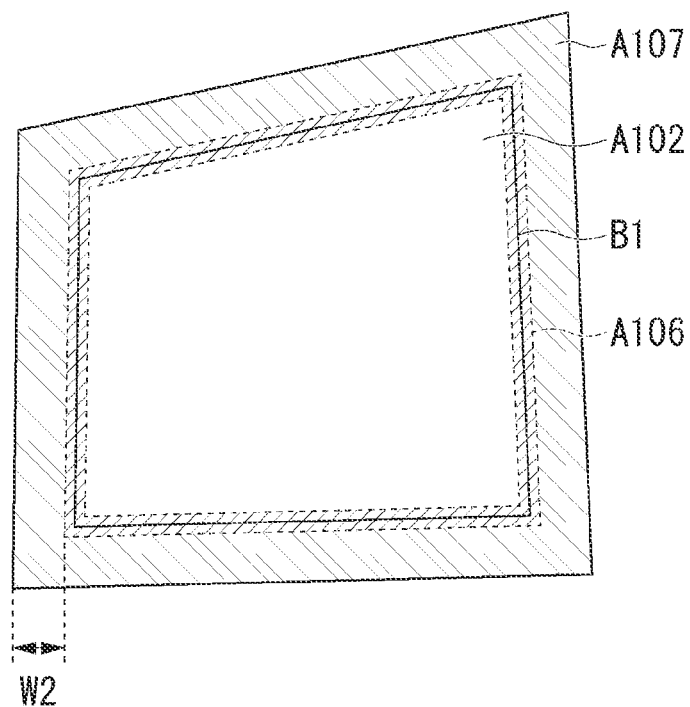
FIG. 7 is a diagram illustrating an example of a snow removal target region in the embodiment of the present invention.

FIG. 7 illustrates an example of a snow removal target region in a case where the work machine 10 is an edge mower. The work machine 10 performs work of cutting grass in a region A106 including a boundary B1 between the region A102, which is a lawn, and the road outside the region A102. The position detector 102 generates position information of the region A106 where the work has been performed.

The controller 206 detects the region A106 including the position indicated by the position information of the work machine 10. The controller 206 sets a region A107 surrounding the region A106 as a snow removal target region in accordance with a predetermined positional relationship between the region A106 and the snow removal target region. The region A107 is adjacent to the region A106 and has a predetermined width W2 set in advance. The width W2 is set in consideration of the width of the road. The worker may set the width W2 in the snow removal machine 20 by operating an operation portion included in the snow removal machine 20.

The predetermined positional relationship indicates that the snow removal target region is outside the region A106. When a region not serving as a snow removal target is outside the region A106 and a snow removal target region is inside the region A106, the predetermined positional relationship may indicate that a snow removal target region is inside the region A106. For example, the worker inputs the information indicating the positional relationship to the work machine 10 by operating the operation unit of the snow removal machine 20. The work machine 10 associates that information with the position information of the work machine 10.

The controller 206 determines a snow removal target region on the basis of the position information of the work machine 10 and the above-described information indicating positional relationship. The controller 206 determines that a snow removal target region is outside the region A106, and sets the region A107 as a snow removal target region. The controller 206 controls the traveling unit 205 so that the position of the snow removal machine 20 is included in the region A107. The snow removal machine 20 performs snow removal work in the region A107.

The controller 206 may determine the snow removal target region on the basis of the position information of the work machine 10 and the map information. When the map information indicates that there is a road outside the region A106, the controller 206 sets the region A107 adjacent to the region A106 and having the predetermined width W2 as a snow removal target region. When the map information indicates that there is no road inside the region A106, the controller 206 excludes the region A102 adjacent to the region A106 from the snow removal target region.

Figure 8:
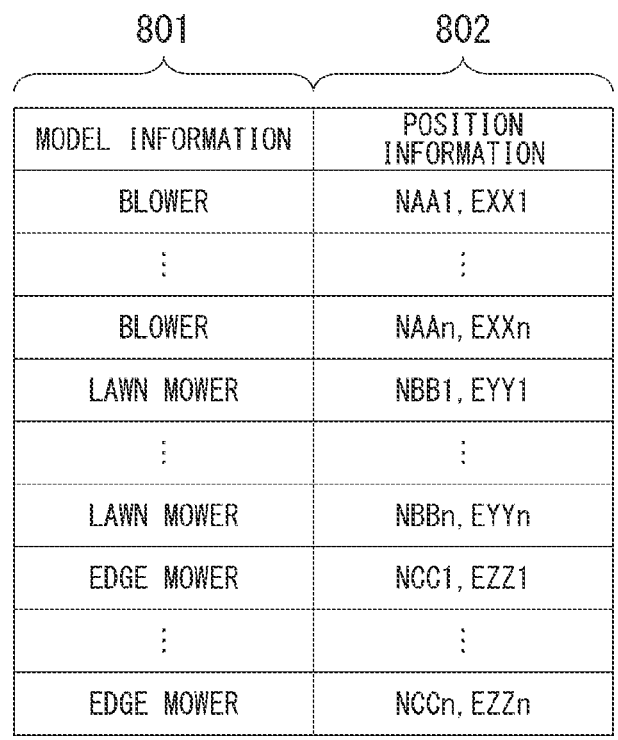
FIG. 8 is a diagram illustrating an example of position information in the embodiment of the present invention.

FIG. 8 illustrates an example of the position information stored in the storage 202. Model information 801 and position information 802 are associated with each other. The model information 801 indicates the model of the work machine 10. The position information 802 includes latitude and longitude. In the example illustrated in FIG. 8, position information generated by a plurality of work machines 10 is stored in the storage 202. When the model of the work machine 10 is fixed to one model, the model information 801 is unnecessary.

In step S204 illustrated in FIG. 3, the controller 206 determines the snow removal target region in accordance with a method corresponding to the model information 801. For example, when the model information 801 indicates a blower, the controller 206 determines the snow removal target region in accordance with the method described with reference to FIG. 4. In a case where the model information 801 indicates a lawn mower, the controller 206 determines the snow removal target region in accordance with the method described with reference to FIG. 5 or FIG. 6. In a case where the model information 801 indicates an edge mower, the controller 206 determines the snow removal target region in accordance with the method described with reference to FIG. 7.

The controller 206 may determine the snow removal target region on the basis of the position information of the plurality of work machines 10. For example, the controller 206 may determine the snow removal target region on the basis of the position information of the blower and the position information of the lawn mower. The controller 206 may determine the snow removal target region on the basis of the position information of the blower and the position information of the edge mower. The controller 206 may determine the snow removal target region on the basis of the position information of the lawn mower and the position information of the edge mower. The controller 206 may determine the snow removal target region on the basis of the position information of the blower, the position information of the lawn mower, and the position information of the edge mower.

Since the position information of the plurality of work machines 10 is used, the accuracy of the snow removal target region is improved. In particular, the accuracy of the boundary of the snow removal target region is improved.

As described above, when the work machine 10 is performing work, the position detector 102 detects the position of the work machine 10. The controller 206 determines the snow removal target region on the basis of the position of the work machine 10. When the work machine 10 is performing work, the position information of the work machine 10 is automatically registered. Therefore, work performed only for registering the position of the snow removal target is unnecessary, and thus the labor of the worker is reduced. Therefore, the snow removal system 1 can easily set the snow removal target region in the snow removal machine 20.

In addition, the work machine 10 can acquire more accurate position information at the work site. Therefore, the accuracy of position recognition is improved as compared with a case where a snow removal target region is designated on the basis of an existing map and the snow removal machine 20 is caused to perform the snow removal work in that region.

Modification Example of Embodiment

Figure 9:
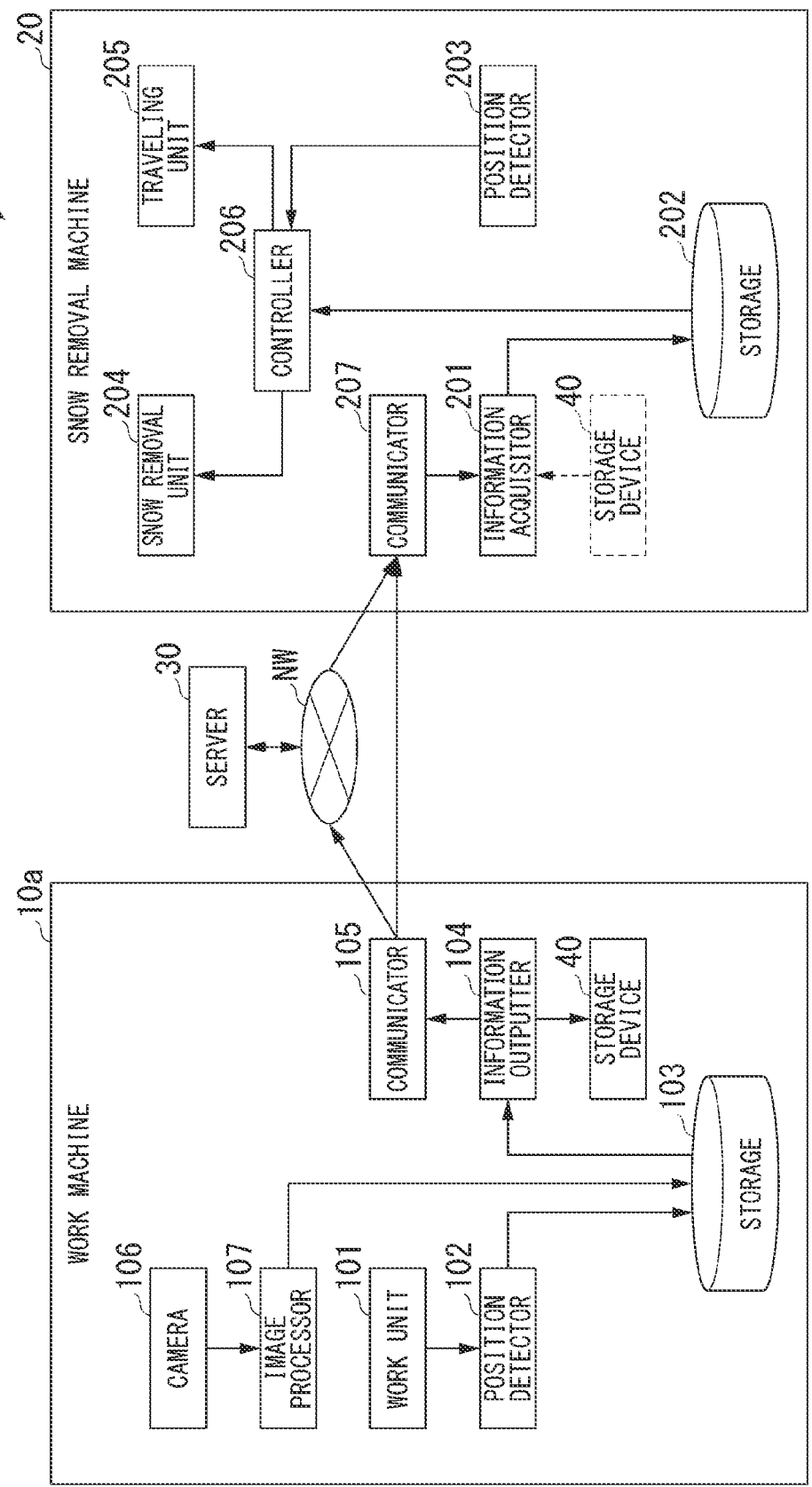
FIG. 9 is a block diagram illustrating a constitution of a snow removal system according to a modification example of the embodiment of the present invention.

FIG. 9 illustrates a constitution of a snow removal system 1a according to a modification example of the embodiment of the present invention. A constitution of the snow removal system 1a will be described with reference to FIG. 9. The snow removal system 1a illustrated in FIG. 9 includes a work machine 10a and a snow removal machine 20. Description of the same elements as in the constitution illustrated in FIG. 1 will be omitted.

The work machine 10a is a blower or a vacuum cleaner, and performs work of removing grass or the like in a snow removal target region. The work machine 10a includes a work unit 101, a position detector 102, a storage 103, an information outputter 104, a camera 106, and an image processor 107.

The camera 106 includes an imaging element and acquires an image. The image processor 107 processes the image acquired by the camera 106 and generates feature information indicating a feature of the snow removal target region. The image processor 107 includes a processor such as a CPU, a digital signal processor (DSP), or a graphics processing unit (GPU). The storage 103 stores the position information generated by the position detector 102 and the feature information generated by the image processor 107. The information outputter 104 outputs the position information and the feature information stored in the storage 103.

The snow removal machine 20 includes an information acquisitor 201, a storage 202, a position detector 203, a snow removal unit 204, a traveling unit 205, and a controller 206. The information acquisitor 201 acquires position information and feature information of the work machine 10. The storage 202 stores the position information and the feature information acquired by the information acquisitor 201. The controller 206 controls the traveling unit 205 on the basis of the position information of the work machine 10 stored in the storage 202, the feature information stored in the storage 202, and the position information of the snow removal machine 20 generated by the position detector 203.

An example in which obstacle information is used as the feature information will be described with reference to FIG. 10. FIG. 10 illustrates obstacle information stored in storage 202. The obstacle information indicates the position of an obstacle that hinders traveling of the snow removal machine 20 in the snow removal target region.

Position information 1001 and obstacle information 1002 are associated with each other. The obstacle information 1002 indicates the presence or absence of an obstacle at a position where the work machine 10 has performed work. For example, the obstacle is a damage such as a hole on a road. The obstacle may be an artifact such as a traffic light, a guardrail, or a road sign. The image processor 107 detects an obstacle by processing the image acquired by the camera 106. When the obstacle information 1002 indicates that an obstacle is present, the position information 1001 associated with the obstacle information 1002 indicates the position of the obstacle. In the example illustrated in FIG. 10, an obstacle exists at a position "NAAk, EXXk" indicated by the position information 1001.

The controller 206 excludes the position of the obstacle from the snow removal target region. The controller 206 controls the traveling unit 205 so that the position of the snow removal machine 20 is included in the snow removal target region and the snow removal machine 20 does not pass the position of the obstacle. As a result, the snow removal system 1 can cause the snow removal machine 20 to perform the snow removal work at a position excluding the position where the obstacle exists.

The obstacle information 902 may include information indicating the type of obstacle. The worker may input the obstacle information to the work machine 10 by operating an operation unit included in the snow removal machine 20.

An example of using unevenness information as the feature information will be described with reference to FIG. 11. FIG. 11 illustrates the unevenness information stored in storage 202. The unevenness information indicates the position of unevenness on the surface of the snow removal target region.

Position information 1101 and unevenness information 1102 are associated with each other. The unevenness information 1102 indicates the presence or absence of unevenness at a position where the work machine 10 has performed work. The unevenness is a portion where the height of the surface is uneven. For example, the unevenness is a protrusion such as a stone or a recess such as a depression of a road. The unevenness may be a step. The image processor 107 detects unevenness by processing the image acquired by the camera 106. When large unevenness that makes traveling of the snow removal machine 20 difficult is detected, the unevenness is recorded as obstacle information. In a case where the unevenness information 1102 indicates that there is unevenness, the position information 1101 associated with the unevenness information 1102 indicates the position of the unevenness. In the example illustrated in FIG. 11, unevenness exists at a position "NAAk, EXXk" indicated by the position information 1101.

The controller 206 controls the traveling unit 205 so that the position of the snow removal machine 20 is included in the snow removal target region. In addition, the controller 206 controls the speed of the snow removal machine 20 on the basis of the unevenness information 1102. For example, the controller 206 causes the snow removal machine 20 to travel at a speed lower than a predetermined speed at a position where the unevenness exists. The controller 206 causes the snow removal machine 20 to travel at a speed higher than the predetermined speed at a position where there is no unevenness. As a result, the snow removal system 1 can control the speed of the snow removal machine 20 in accordance with the unevenness on the road. The worker may input the unevenness information to the work machine 10 by operating an operation unit included in the snow removal machine 20.

An example of using number-of-people information as the feature information will be described with reference to FIG. 12. FIG. 12 illustrates the number-of-people information stored in the storage 202. The number-of-people information indicates the number of people in the snow removal target region and a time period of work performed by the work machine 10.

Position information 1201, number of people 1202, and time 1203 are associated with each other. The number of people 1202 indicates the number of people at the position where the work machine 10 has performed work. The image processor 107 detects a person's face by processing the image acquired by the camera 106. The number of detected faces is recorded as the number of people 1202. The time 1203 indicates the time when the position of the work machine 10 is detected.

The controller 206 extracts the number of people 1202 associated with each of two or more times 1203 included in the time period in which the snow removal machine 20 travels. The controller 206 calculates an average value of the extracted two or more times 1203. The number-of-people information corresponds to a combination of the calculated average value and the time period thereof. The length of the predetermined time period is 5 minutes, 10 minutes, 15 minutes, 30 minutes, 1 hour, or the like.

The controller 206 controls the speed of the snow removal machine 20 on the basis of the number-of-people information. For example, the controller 206 causes the snow removal machine 20 to travel at a speed lower than a predetermined speed in a time period in which the average value is larger than a predetermined value. The controller 206 causes the snow removal machine 20 to travel at a speed higher than the predetermined speed in a time period in which the average value is equal to or less than the predetermined value. As a result, the snow removal system 1 can control the speed of the snow removal machine 20 in accordance with the degree of congestion of people on the road. The worker may input the number of people to the work machine 10 by operating the operation unit included in the snow removal machine 20.

The controller 206 may set the work time (schedule of snow removal work) of the snow removal unit 204 on the basis of the number-of-people information. For example, the controller 206 sets the work time of the snow removal unit 204 so that the snow removal unit 204 works a lot in a time period when there are few people or the snow removal unit 204 works only in a time period when there are few people.

The work machine 10a may be an edge mower. When the work machine 10a performs work in the region A106 illustrated in FIG. 7, the image processor 107 may determine whether or not each of the region A102 and the region A107 illustrated in FIG. 7 is a snow removal target region. For example, the image processor 107 may determine whether or not a characteristic structure on the road is captured in the image. The characteristic structure is a traffic light, a guardrail, a road sign, or the like. In a case where the characteristic structure is captured in the image, the image processor 107 may determine that the region shown in the image is a snow removal target region. The image processor 107 may generate positional relationship information indicating a predetermined positional relationship between the region A106 and the snow removal target region. In the example illustrated in FIG. 7, since the region A107 is a snow removal target region, the predetermined positional relationship indicates that the snow removal target region is outside the region A106.

The storage 103 may store the position information generated by the position detector 102 and the positional relationship information. The information outputter 104 may output the position information and the positional relationship information stored in the storage 103. The information acquisitor 201 may acquire the position information of the work machine 10 and the positional relationship information of the work machine 10. The storage 202 may store the position information and the positional relationship information acquired by the information acquisitor 201. The controller 206 may determine the snow removal target region on the basis of the position information of the work machine 10 and the positional relationship information.

The snow removal machine 20 may include an image processor without the work machine 10a including the image processor 107. The storage 103 may store the position information generated by the position detector 102 and the image generated by the camera 106. The information outputter 104 may output the position information and the image stored in the storage 103. The information acquisitor 201 may acquire the position information and the image of the work machine 10. The storage 202 may store the position information and the image acquired by the information acquisitor 201. The image processor of the snow removal machine 20 may generate the feature information by processing the image stored in the storage 202.

The storage 103 may store the position information generated by the position detector 102 and accuracy information indicating the accuracy of the position indicated by the position information. For example, the accuracy information indicates the number of GPS satellites detected by the position detector 102. The information outputter 104 may output the position information and the accuracy information stored in the storage 103. The information acquisitor 201 may acquire the position information and the accuracy information of the work machine 10. The storage 202 may store the position information and the accuracy information acquired by the information acquisitor 201. The controller 206 may control the traveling unit 205 on the basis of the position information of the work machine 10 and the accuracy information.

For example, in a region having low accuracy such as a region close to a building or a region close to a tree, the controller 206 may cause the snow removal machine 20 to travel at a speed lower than a predetermined speed. Alternatively, the controller 206 may cause the position detector 102 to recognize the position thereof by using a method (odometry, camera, LiDAR, or the like) other than a method using a global navigation satellite system (GNSS).

Summary of Embodiments

The above-described embodiment discloses the following snow removal system and snow removal method.

According to a first aspect of the present invention, a snow removal system 1 includes a work machine 10 and a snow removal machine 20. The work machine 10 includes a work unit 101 configured to perform work and a position detector 102 configured to detect a position of the work machine 10 when the work unit 101 has performed the work and generate position information indicating the detected position. The snow removal machine 20 is capable of autonomous movement and includes a snow removal unit 204 configured to perform snow removal work and a controller 206 configured to cause the snow removal unit 204 to perform the snow removal work on the basis of the position information. As a result, the snow removal system 1 can easily set a snow removal target region in the snow removal machine 20.

According to a second aspect of the embodiment, in the first aspect, the work machine 10 further includes an obstacle information generator (for example, camera 106) configured to generate obstacle information indicating a position of an obstacle that hinders traveling of the snow removal machine 20 in a first region (for example, region A101) serving as a snow removal target. The controller 206 causes the snow removal unit 204 to perform the snow removal work on the basis of the obstacle information in the first region determined on the basis of the position indicated by the position information. As a result, the snow removal system 1 can avoid performing the snow removal work at a position where an obstacle exists.

According to a third aspect of the embodiment, in the first or second aspect, the work machine 10 further includes an unevenness information generator (for example, camera 106) configured to generate unevenness information indicating a position of unevenness on a surface of a first region (for example, region A101) serving as a snow removal target. The controller 206 controls a speed of the snow removal machine 20 on the basis of the unevenness information in the first region determined on the basis of the position indicated by the position information. As a result, the snow removal system 1 can cause the snow removal machine 20 to travel safely on a road having unevenness.

According to a fourth aspect of the embodiment, in any one of the first to third aspects, the work machine 10 further includes a number-of-people information generator (for example, camera 106) configured to generate number-of-people information indicating a number of people in a first region (region A101) serving as a snow removal target and a time period of the work. The controller 206 controls a speed of the snow removal machine 20 or a work time of the snow removal unit 204 on the basis of the number-of-people information in the first region determined on the basis of the position indicated by the position information. As a result, the snow removal system 1 can cause the snow removal machine 20 to travel safely on a road on which many people are present.

According to a fifth aspect of the embodiment, in any one of the first to fourth aspects, when the work machine 10 is in a first region (for example, region A101) serving as a snow removal target, the work unit 101 performs the work. The controller 206 causes the snow removal unit 204 to perform the snow removal work in the first region including the position indicated by the position information. As a result, the snow removal system 1 can easily set a region where the work machine 10 has performed the work as a snow removal target region in the snow removal machine 20.

According to a sixth aspect of the embodiment, in any one of the first to fourth aspects, when the work machine 10 is in a second region (for example, A102) that is adjacent to a first region (for example, A101) serving as a snow removal target and that does not serve as the snow removal target, the work unit 101 performs the work. The controller 206 causes the snow removal unit 204 to perform the snow removal work in the first region determined on the basis of the position indicated by the position information. As a result, the snow removal system 1 can easily set a region adjacent to the region where the work machine 10 has performed the work as a snow removal target region in the snow removal machine 20.

According to a seventh aspect of the embodiment, in the sixth aspect, the controller 206 determines the first region (for example, region A104) on the basis of information indicating a type of a region (for example, region A104 and region A105) adjacent to the second region (for example, region A103). As a result, the snow removal system 1 can set the snow removal target region in the snow removal machine 20 in consideration of the type of the region adjacent to the region where the work machine 10 has performed the work.

According to an eighth aspect of the embodiment, in any one of the first to fourth aspects, when the work machine 10 is in a third region (for example, region A106) including a boundary between a first region (for example, region A101) serving as a snow removal target and a second region (for example, region A102) not serving as the snow removal target, the work unit 101 performs the work. The controller 206 causes the snow removal unit 204 to perform the snow removal work in the first region determined on the basis of the position indicated by the position information. As a result, the snow removal system 1 can easily set a region adjacent to the region where the work machine 10 has performed the work as a snow removal target region in the snow removal machine 20.

According to a ninth aspect of the embodiments, in any one of the first to eighth aspects, the work machine 10 includes at least one of a blower, a vacuum cleaner, a grass mower, and an edge mower. As a result, the snow removal system 1 can easily set the snow removal target region in the snow removal machine 20 in accordance with the type of the work machine 10.

According to a tenth aspect of the embodiment, a snow removal method includes a work step, a detection step, and a snow removal step. A snow removal method includes a work step, a detection step, and a snow removal step. The work machine 10 performs work in the work step (for example, step S101). When the work machine 10 has performed the work, in the detection step (for example, step S102), the work machine 10 detects a position of the work machine 10 and generates position information indicating the detected position. The snow removal machine 20 performs snow removal work on the basis of the position information in the snow removal step (for example, steps S203 and S204).

Although the embodiments of the present invention have been described in detail with reference to the drawings, the specific constitution is not limited to the above embodiments, and design changes and the like without departing from the gist of the present invention are also included. The elements described in the above embodiments may be appropriately combined.

INDUSTRIAL APPLICABILITY

According to each embodiment of the present invention, in the snow removal system and the snow removal method, a snow removal target region can be easily set in the snow removal machine.

REFERENCE SIGNS LIST

1, 1a Snow removal system
10, 10a Work machine
20 Snow removal machine
101 Work unit
102, 203 Position detector
103, 202 Storage
104 Information outputter
105, 207 Communicator
106 Camera
107 Image processor
201 Information acquisitor
204 Snow removal unit
205 Traveling unit
206 Controller

The invention claimed is:

1. A snow removal system comprising:
a work machine which includes a work assembly configured to perform work and a position detector configured to detect a position of the work machine when the work assembly has performed the work and generate position information indicating the detected position; and
a snow removal machine which is capable of autonomous movement and includes a snow removal assembly configured to perform snow removal work and a controller configured to cause the snow removal assembly to perform the snow removal work on the basis of the position information, wherein
the work machine further includes an unevenness information generator configured to generate unevenness information indicating a position of unevenness on a surface of a first region serving as a snow removal target, and
the controller controls a speed of the snow removal machine on the basis of the unevenness information in the first region determined on the basis of the position indicated by the position information.

2. The snow removal system according to claim 1, wherein
the work machine further includes an obstacle information generator configured to generate obstacle information indicating a position of an obstacle that hinders traveling of the snow removal machine in a first region serving as a snow removal target, and
the controller causes the snow removal assembly to perform the snow removal work on the basis of the obstacle information in the first region determined on the basis of the position indicated by the position information.

3. The snow removal system according to claim 1, wherein
when the work machine is in a first region serving as a snow removal target, the work assembly performs the work, and
the controller causes the snow removal assembly to perform the snow removal work in the first region including the position indicated by the position information.

4. The snow removal system according to claim 1, wherein the work machine includes at least one of a blower, a vacuum cleaner, a grass mower, and an edge mower.

5. A snow removal system comprising:
a work machine which includes a work assembly configured to perform work and a position detector configured to detect a position of the work machine when the work assembly has performed the work and generate position information indicating the detected position; and
a snow removal machine which is capable of autonomous movement and includes a snow removal assembly configured to perform snow removal work and a controller configured to cause the snow removal assembly to perform the snow removal work on the basis of the position information, wherein
the work machine further includes a number-of-people information generator configured to generate number-of-people information indicating a number of people in a first region serving as a snow removal target and a time period of the work, and
the controller controls a speed of the snow removal machine or a work time of the snow removal assembly on the basis of the number-of-people information in the first region determined on the basis of the position indicated by the position information.

6. A snow removal system comprising:
a work machine which includes a work assembly configured to perform work and a position detector configured to detect a position of the work machine when the work assembly has performed the work and generate position information indicating the detected position; and
a snow removal machine which is capable of autonomous movement and includes a snow removal assembly configured to perform snow removal work and a controller configured to cause the snow removal assembly to perform the snow removal work on the basis of the position information, wherein
when the work machine is in a second region that is adjacent to a first region serving as a snow removal target and that does not serve as the snow removal target, the work assembly performs the work, and
the controller causes the snow removal assembly to perform the snow removal work in the first region determined on the basis of the position indicated by the position information.

7. The snow removal system according to claim 6, wherein
the controller determines the first region on the basis of information indicating a type of a region adjacent to the second region.

8. A snow removal system comprising:
a work machine which includes a work assembly configured to perform work and a position detector configured to detect a position of the work machine when the work assembly has performed the work and generate position information indicating the detected position; and
a snow removal machine which is capable of autonomous movement and includes a snow removal assembly configured to perform snow removal work and a controller configured to cause the snow removal assembly to perform the snow removal work on the basis of the position information, wherein
when the work machine is in a third region including a boundary between a first region serving as a snow removal target and a second region not serving as the snow removal target, the work assembly performs the work, and
the controller causes the snow removal assembly to perform the snow removal work in the first region determined on the basis of the position indicated by the position information.

9. A snow removal method comprising:
a work step in which a work machine performs work;
a detection step in which, when the work machine has performed the work, the work machine detects a position of the work machine and generates position information indicating the detected position;
a snow removal step in which a snow removal machine performs snow removal work on the basis of the position information;
a generation step in which an unevenness information generator of the work machine generates unevenness information indicating a position of unevenness on a surface of a first region serving as a snow removal target; and
a control step in which a speed of the snow removal machine is controlled on the basis of the unevenness information in the first region determined on the basis of the position indicated by the position information.

* * * * *